(No Model.)
E. ROAT.
APPARATUS FOR CRYSTALLIZING GRAPE SUGAR.
No. 256,809. Patented Apr. 18, 1882.
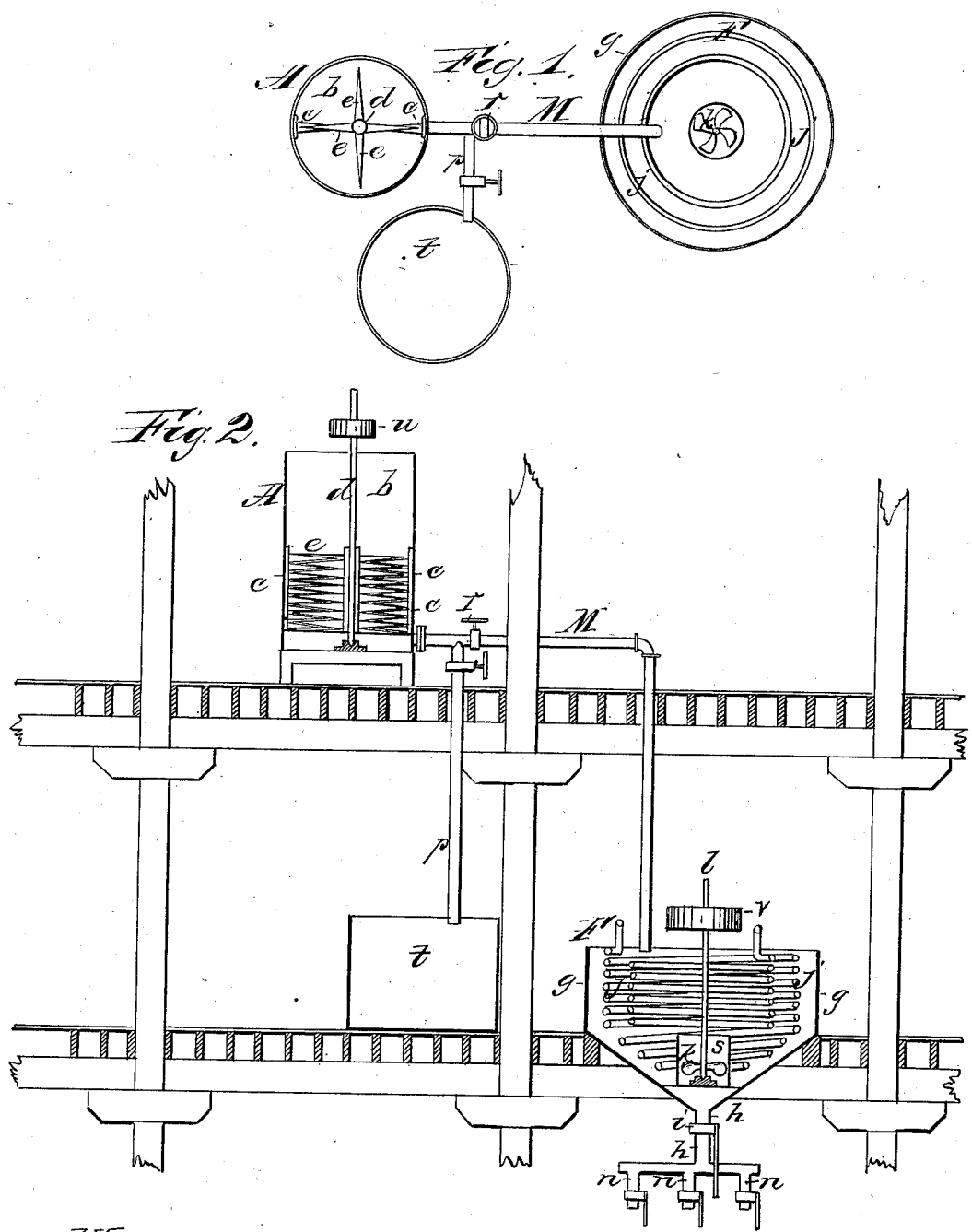

UNITED STATES PATENT OFFICE.

EDWIN ROAT, OF BUFFALO, NEW YORK.

APPARATUS FOR CRYSTALLIZING GRAPE-SUGAR.

SPECIFICATION forming part of Letters Patent No. 256,809, dated April 18, 1882.

Application filed March 17, 1882. (No model.)

*To all whom it may concern:*

Be it known that I, EDWIN ROAT, of Buffalo, in the county of Erie and State of New York, have made an invention of certain new and useful Improvements in Apparatus for Crystallizing Grape-Sugar, and for other purposes to which they may be applicable; and I do hereby declare that the following, in connection with the accompanying drawings, is a full, clear, and exact description and specification of the same.

It has long been well known that grape-sugar can be crystallized or caused to assume a solid form by what is technically called "induction"—that is, by mixing the concentrated sirup of grape-sugar with an emulsion or mixture of fine solid sugar and water or sirup, thereby furnishing nuclei upon which the material may concrete.

The present invention has reference to the apparatus employed for performing this operation; and it consists of certain combinations of devices, which are recited in detail in the claims at the close of this specification.

In order that the same may be fully understood, I have represented in the accompanying drawings, and will proceed to describe the best mode in which I have embodied the said invention for practical use.

In the said drawings, Figure 1 represents a plan of the apparatus, and Fig. 2 represents a vertical section thereof arranged upon the floors of a sugar-house.

In order that the emulsion of the sugar may be rapidly prepared and conveniently applied, the mixer A is provided. This mixer has a tank, *b*, to whose sides blades or fixed beaters *c c* are secured, which are arranged in upright rows and project inward toward the center of the tank. A revolving-shaft, *d*, provided with similar blades or beaters, *e e*, is constructed to revolve centrally in the tank, its beaters being arranged relatively to the stationary beaters *c c* of the tank, so that the former in revolving pass between the latter.

The crystallizer F is arranged, by preference, upon a floor at a lower level than that on which the mixer A is placed. The tank *g* of this crystallizer is constructed, by preference, with a cylindrical body and a conical bottom, at the lower end of which is the discharge-pipe *h*, which is fitted with a valve or gate, *i*. The tank is fitted with a coil of pipes, *j*, through which water may be forced or permitted to flow for the purpose of cooling the contents of the tank rapidly. In the center of the tank there is an agitator, *k*, which has inclined or screw-formed blades like those of a screw-propeller, and is constructed to revolve with the central shaft, *l*. In order that this screw-bladed agitator may create a current in the crystallizer which will bring all the contents thereof in succession within the range of action of its blades and of the cooling-pipes, the agitator is surrounded by the drum *s*, which is open at top and at bottom.

The lower end of the discharge-pipe *h* is divided into braches *n n n*, each fitted with a valve or gate, so that several molds may be fitted side by side, thus enabling the contents of the crystallizer to be rapildy discharged.

The crystallizer F and the mixer A are combined by means of a pipe, M, fitted with a valve or gate, *r*; and in order that the emulsion may be applied to the crystallizer by hand when necessary, the pipe M is fitted with a branch, *p*, (also provided with a valve or gate.) At the lower end of this branch pipe a tank, *t*, is arranged, from which the emulsion may be dipped by pails or other means and be poured into the crystallizer.

The shaft *d* of the mixer and the shaft *l* of the crystallizer are fitted with belt-pulleys *u v*, to which belts are applied for the purpose of driving the shafts by power.

The warm concentrated sirup which is to be crystallized or concreted into grape-sugar is admitted into the crystallizer and is subjected to the cooling action of the coil of pipes *j*, while the agitator *k* produces an active circulation of it, continually changing the portions which are in contact with the pipes by forcing upward the contents of the drum *s* of the agitator, which are continually replaced by the entrance at the bottom of the drum of fresh quantities of the sirup from the adjacent portion of the tank. When the mass in the tank has been cooled to the requisite temperature the requisite quantity of the emulsion of fine sugar and sirup, prepared in the mixer A by thoroughly beating the fine sugar with sirup, is admitted into the crystallizer by the pipe M, or it may be drawn through the branch pipe r and poured into the crystallizer with pails. The agitation in the crystallizer is then continued until the emulsion is thoroughly beaten up with and disseminated through the sirup, after which the mixture is discharged by means of the discharge-pipe h and its branches n n n into suitable molds, in which it remains until concreted.

Long previous to my present invention I invented and used a crystallizer comprising a tank, cooling-pipes, a central agitator, and a discharge-pipe. I therefore do not now claim broadly that combination. The crystallizer hereinbefore described is an improvement upon that so used by me previously, because the confinement by means of the drum of the portion of material upon which the agitator-blades act causes the same to move from the agitator in a strong current and compels a thorough circulation of the contents of the crystallizer, so that the whole of it is thoroughly agitated and cooled with rapidity.

The screw-agitator may be operated to direct the current either upward or downward in the tank, as deemed best; but I prefer to operate it to direct the current upward.

I claim as my invention—

1. The combination, substantially as before set forth, of the mixer and the crystallizer, whereby the emulsion may be conveniently supplied to the crystallizer.

2. The combination, substantially as before set forth, of the tank, the screw-bladed agitator, and the drum surrounding said agitator.

3. The combination, substantially as before set forth, of the tank of the crystallizer, the coil of pipe therein, the screw-bladed agitator, and the drum surrounding said agitator.

4. The combination, substantially as before set forth, of the tank of the crystallizer, the coil of pipes therein, the agitator, and the discharge-pipe divided into branches.

Witness my hand this 1st day of February, A. D. 1882.

EDWIN ROAT.

Witnesses:
W. H. THORNTON,
H. A. PRATT.